United States Patent
Freed et al.

(10) Patent No.: US 11,705,125 B2
(45) Date of Patent: Jul. 18, 2023

(54) DYNAMIC VOICE INPUT DETECTION FOR CONVERSATION ASSISTANTS

(71) Applicant: International Business Machines Corporation, Armonk, NY (US)

(72) Inventors: Andrew R. Freed, Cary, NC (US); Corville O. Allen, Morrisville, NC (US); Shikhar Kwatra, San Jose, CA (US); Joseph Kozhaya, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 17/214,057

(22) Filed: Mar. 26, 2021

(65) Prior Publication Data
US 2022/0310088 A1    Sep. 29, 2022

(51) Int. Cl.
*G10L 15/22* (2006.01)
*G10L 15/05* (2013.01)

(52) U.S. Cl.
CPC .............. *G10L 15/22* (2013.01); *G10L 15/05* (2013.01)

(58) Field of Classification Search
CPC ......... G10L 15/22; G10L 25/78; G10L 15/04; G10L 25/87; G10L 15/05; G10L 15/26; G10L 15/18; G10L 2015/223; G10L 15/30; G10L 17/00; G10L 15/00
See application file for complete search history.

(56) References Cited

U.S. PATENT DOCUMENTS

| | | | |
|---|---|---|---|
| 5,848,388 A | 12/1998 | Power | |
| 9,311,932 B2 * | 4/2016 | Carter | G10L 15/04 |
| 9,437,186 B1 * | 9/2016 | Liu | G10L 15/22 |
| 9,607,613 B2 * | 3/2017 | Buchanan | G10L 15/26 |
| 9,953,088 B2 * | 4/2018 | Gruber | G06F 16/24575 |
| 10,311,872 B2 * | 6/2019 | Howard | G06F 3/167 |
| 10,593,352 B2 * | 3/2020 | Simko | G10L 15/18 |
| 10,818,308 B1 * | 10/2020 | Chu | G10L 15/26 |

(Continued)

FOREIGN PATENT DOCUMENTS

| | | |
|---|---|---|
| AU | 2015266863 B2 | 9/2016 |
| CN | 1950882 A | 4/2007 |
| CN | 103226949 B | 7/2013 |

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Vijay B Chawan
(74) *Attorney, Agent, or Firm* — Kulsoom Hasan; Haley J. McClory

(57) ABSTRACT

A processor may receive data regarding a context for a first dialog turn. The processor may monitor a voice input from a user for the first dialog turn. The processor may detect a first pause in the voice input, the first pause having a duration that satisfies a time threshold. The processor may receive, based on the first pause, first voice input data. The processor may analyze the first voice input data. The processor may determine that additional time is recommended for the voice input to be provided by the user.

20 Claims, 5 Drawing Sheets

(56) References Cited

U.S. PATENT DOCUMENTS

| | | | | |
|---|---|---|---|---|
| 2002/0042709 A1* | 4/2002 | Klisch | .................... | G10L 15/04 |
| | | | | 704/E15.005 |
| 2007/0118374 A1* | 5/2007 | Wise | ....................... | G10L 21/06 |
| | | | | 704/235 |
| 2011/0040554 A1* | 2/2011 | Audhkhasi | ............. | G09B 19/04 |
| | | | | 704/235 |
| 2012/0297284 A1* | 11/2012 | Matthews, III | ......... | G06F 3/017 |
| | | | | 715/233 |
| 2013/0275875 A1* | 10/2013 | Gruber | .................... | G06F 3/167 |
| | | | | 715/728 |
| 2017/0255446 A1* | 9/2017 | Malatesha | ............. | G06F 3/0488 |
| 2019/0325898 A1* | 10/2019 | O'Hart Kinney | ....... | G10L 15/02 |

OTHER PUBLICATIONS

Tillman, M., "How to make Google Assistant listen for your string of follow-up questions." Published Jun. 22, 2018. 10 pages. Published by Pocketlint, https://www.pocket-lint.com/smart-home/news/google/144901-how-to-make-google-assistant-listen-for-your-string-of-follow-up-questions.

* cited by examiner

DYNAMIC VOICE INPUT DETECTION FOR CONVERSATION ASSISTANTS

BACKGROUND

The present disclosure relates generally to the field of voice assistants, and more specifically to determining when a user is finished providing a voice input to the voice assistant.

Some voice assistants utilize predefined time periods in their speech engines for waiting after the last audio signal from a user to consider the user as having finished speaking. This time period may be the time period before sending the output from the speech engine to the text-based assistant layer.

SUMMARY

Embodiments of the present disclosure include a method, computer program product, and system determining when a user is finished providing a voice input to the voice assistant. A processor may receive data regarding a context for a first dialog turn. The processor may monitor a voice input from a user for the first dialog turn. The processor may detect a first pause in the voice input, the first pause having a duration that satisfies a time threshold. The processor may receive, based on the first pause, first voice input data. The processor may analyze the first voice input data. The processor may determine that additional time is recommended for the voice input to be provided by the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
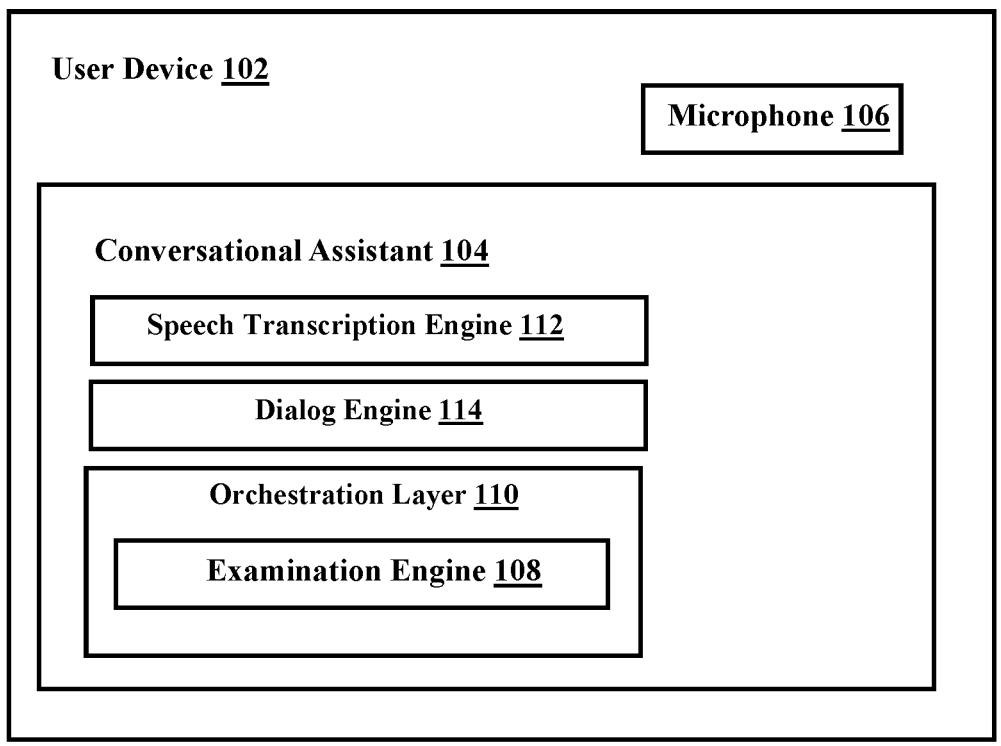
FIG. 1 is a block diagram of an exemplary system determining when a user is finished providing a voice input, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of voice assistants, and more specifically to determining when a user is finished providing a voice input to the voice assistant. While the present disclosure is not necessarily limited to such applications, various aspects of the disclosure may be appreciated through a discussion of various examples using this context.

Some conversational assistants or voice assistant programs utilize predefined time periods in their speech engines for waiting after the last audio signal from a user to consider the user as having finished speaking. This time period may be the time period before sending the output from the speech engine to the text-based assistant layer. Predefined time periods may result in the time being too short for new users who are unfamiliar with the conversational assistant program or too long for more experienced users.

In some embodiments, a processor may receive data regarding a context for a first dialog turn. In some embodiments, the dialog turn may relate to an occasion for a user to provide a voice input into a voice assistant program. In some embodiments, the voice assistant program may involve dialog turns where the voice assistant program and the user take turns communicating with the other. For example, the voice assistant program may prompt the user with the general question, "How may I help you?". The user may respond, "I would like help changing my account settings." As another example, the user may speak without a prompt and ask the voice assistant, "Help me change my account settings." In some embodiments the voice assistant program may be a conversational assistant program, a voice controlled personal assistant, a voice controlled intelligent virtual assistant, an interactive voice response system, a telephone assistant, etc.

In some embodiments, the contextual data may include information about the user providing a voice input to the voice assistant. For example, the contextual data may include information identifying the user (e.g., a user identification number, a phone number associated with the user, a username for a related program) and background information about the user that is contextually relevant to an input the user may provide during a dialog turn (e.g., information regarding work location, work department, job title, etc.). In some embodiments, the contextual data may include information about the various types of voice inputs that the user may provide. For example, the user may make a particular type of request related to a particular type of application that the voice assistant provides assistance with, the user may answer a question from a set of questions that the voice assistant asks regarding the particular application, or the user may make a request in response to a general prompt from the voice assistant (e.g., "How may I help you?").

In some embodiments, the contextual data may be regarding the vocal characteristics, speech patterns, or word usage of the user that has been observed from the user's previous use of this or other voice assistants or other applications for which the user provides a voice input (e.g., speaks into a microphone in communication with a computing device).

In some embodiments, the processor may monitor a voice input from a user for the first dialog turn. In some embodiments, the processor may detect a first pause in the voice input that has a duration that satisfies a time threshold. For example, a conversational assistant program may prompt a voice input form a user by asking, "How may I help you?" A first user may respond, "I need help with benefits and eligibility." Another user may respond "I need help with eligibility" and pause for three seconds between the word "need" and the words "help with eligibility." The processor may detect the three-second pause. If the time threshold is satisfied by pauses greater than two seconds, the processor may detect that the pause has a duration that satisfies the time threshold.

In some embodiments, the processor may receive first voice input data based on detecting a first pause that has a duration that satisfies the time threshold. In some embodiments, the first pause may be used by the processor to determine how likely it is that the user has finished providing a voice input (e.g., is done speaking and providing the question, request, or response needed for the dialog turn with the voice assistant). In some embodiments, the time threshold characterizing the first pause may relate to how long the voice assistance program should wait until after the last voice input from a user to consider whether the user is done speaking. In some embodiments, the first voice input data may relate to the voice input provided by the user from the time the user began speaking (e.g., in response to a prompt asking a question) until the time the of the pause that satisfied the time threshold.

For example, the conversational assistant may ask the user, "What is your nine digit member ID?" A first user may response quickly "123456789" and only pause at most for 0.5 seconds between each number. A second user may response "987 (3 second pause) 654321." A third user may respond "712 (1.5 second pause) 47 (2.5 second pause) 4768 (3 second pause)." If the time threshold for the first pause is satisfied by pauses greater than two seconds, all nine digits may be part of the first voice input data for the first user. Only the first three digits may be part of the first voice input data for the second user because the three second pause satisfies the time threshold, and the second user's response is treated as likely complete after the three second pause. The first five digits of the third user's member ID may be included in the first voice input data of the third user because the first five digits preceded a 2.5 second pause.

In some embodiments, the first voice input data may be provided to the processor in the form of a transcript of the words spoken by the user. In some embodiments, the first voice input data may be provided in the form of audio data capturing an audio recording of the user stating the first segment of the voice input.

In some embodiments, the processor may analyze the first voice input data. In some embodiments, the processor may determine that additional time is recommended for the voice input to be provided by the user. In some embodiments, the processor may use an examination engine including an AI model that has been trained to analyzes characteristics of the first voice input data that are indicative of the voice input being a complete response or indicative of the response being an incomplete response. In some embodiments, the AI model may identify features of the first voice input data that are indicative of the voice input being an incomplete response and determine that the user may need additional time to complete her dialog turn. In some embodiments, the examination engine may analyze characteristics of the first voice input data that relate to vocal characteristics (tone, volume, cadence, etc.) of the user. In some embodiments, the examination engine may analyze characteristics of the first voice input data that relate to the words spoken by the user (e.g., use of conjunctions or filler words at the end of a phrase).

In some embodiments, the examination engine may analyze characteristics of the first voice input data that relate to characteristics of expected types of voice inputs. In some embodiments, the examination engine may analyze characteristics of the first voice input data that related to features identified and analyzed by the AI model of the examination engine as it was being trained to make a determination about whether additional time is recommended/needed for a voice input. In some embodiments, the examination engine may analyze characteristics of the first voice input data that are identified as typical for (e.g., commonly associated with) the user and not indicative of whether additional time is needed for the voice input to be provided (e.g., not indicative of whether the user is done speaking). In some embodiments, the characteristics of the first voice input data that are identified as typical may not be used as the basis for the determination regarding whether additional time is needed for the voice input.

In some embodiments, the processor may compare the analyzed features and known features with which the AI model was trained. In some embodiments, the processor may determine how similar the features are. In some embodiments, the processor may determine whether a similarity factor for each factor exceeds a threshold. In some embodiments, based on a determination that the similarity exceeds a threshold, the processor may conclude that additional time is needed for the user to provide a voice input. In some embodiments, based on determining that additional time is needed for the voice input to be provided by the user, the processor may continue monitoring the voice input from the user for the first dialog turn.

In some embodiments, the determination that additional time is recommended for the voice input may be made using a rule-based system that assigns value to and tabulates the values for features of the first voice input data that are analyzed. For example, time may be increased if the transcript of the current segment (e.g., words captured by the first voice input data) ends with a conjunction or filler word, if the voice inflection trends downward at the end of the segment, if the voice data includes more vocal variation than previous turns, if the transcript of the first voice input data segment does not satisfy a slot response or full intent (e.g., a response of "I need . . . " when asked "How may I help you?"), if the transcript of the segment does not match typical "final" fragments, or if vocal characteristics of the user's voice are not constant (e.g., indicating a hesitant response).

Time may be decreased if the if the transcript of the current segment does not end with a conjunction or filler word, if the voice inflection does not trend downward at the end of the segment, if the first voice input data includes less vocal variation than previous turns, if the transcript of the first voice input data segment satisfies a slot response or full intent (e.g., a response of a nine digit number when asked "what is your user 9-digit user ID?"), if the transcript of the segment matches typical "final" fragments, or if vocal characteristics of the user's voice are constant (e.g., indicating a confident response).

In some embodiments, analyzing the first voice input data may include identifying that an attribute of the first voice input data is indicative of an incomplete voice input. In some embodiments, the attribute may relate to a vocal characteristic of a first voice input data. In some embodiments, the vocal characteristic may relate to features of a voice, including volume, pitch, tone, vocal fry, rhythm, resonance, cadence, inflections, or fluctuations in the aforementioned, duration of speech, occurrence and duration of natural pauses while the user is speaking, etc. In some embodiments, the attributes that are indicative of an incomplete voice input may relate to features of a user's voice that indicate that the user may not be finished speaking (e.g., features that indicate hesitation, uncertainty, distraction, etc.).

For example, the pitch of a user's voice may go down at the end of the segment of speech in the first voice input data (e.g., indicative of uncertainty) rather than going up (e.g., indicative of asking a question, which may be a complete response). In some embodiments, the processor may detect the vocal characteristics of the user's speech in the first voice input data (e.g., how much the user's pitch decreased). In some embodiments, the processor may compare the vocal characteristics of the user's speech to known vocal characteristics (e.g., vocal characteristics that the AI model has been trained to identify) indicative on an incomplete voice input (e.g., compare a 20% decrease in the user's pitch to a 30% decrease that is indicative of an incomplete response). In some embodiments, the processor may determine whether the vocal characteristics of the user's speech meet a threshold similarity to the known vocal characteristics indicative of an incomplete voice input (e.g., the detected vocal characteristic must not deviate more that 35% from the known vocal characteristic to be considered similar).

In some embodiments, analyzing the first response data may include identifying that transcript features of the first voice input data are indicative of an incomplete voice input. In some embodiments, the transcript features may relate to characteristics of the words spoken by the user in the first voice input data. For example, the first voice input data may relate to a string of words (e.g., the transcript of the words spoken by the user) that ends with words that have been determined by the AI model to be indicative of an incomplete voice input when used at the end of the string of words. These words may be conjunctions (e.g., "and," "or," "but") or filler words (e.g., "um," "ah," "like").

In some embodiments, the processor may create a transcript of the words spoken by the user in the first voice input data. In some embodiments, the processor may compare the words in the first voice input data to known transcript characteristics (e.g., a voice input string of words ending in a conjunction or filler word) indicative on an incomplete voice input. In some embodiments, the processor may determine whether the words in the first voice input data meet a threshold similarity to the known transcript characteristics indicative of an incomplete voice input. For example, ending a response in the words "um, and, . . . like" may be known to be indicative of an incomplete voice input. A user's first voice input data segment may end with the words "and, like." If the similarly threshold is set such that words in the first voice input must match more than 60% of the words in the known transcript characteristics to indicate an incomplete voice input, then the final words "and like" of the first voice input data segment indicate that the user gave an incomplete voice input (e.g., the first voice input data that was received was likely an incomplete statement/question/ voice input/response by the user).

In some embodiments, analyzing the first voice input data may include identifying that transcript features of the first voice input data are not indicative of an expected voice input type. In some embodiments, the transcript features may relate to characteristics of the words spoken by the user that are captured by the first voice input data.

In some embodiments, an expected voice input type may relate to various types of voice inputs that the user may provide (e.g., based on the user, based on the application for which a voice assistant is being used, based on the question or prompt that a user is responding to, etc.). In some embodiments, the expected voice input type may relate to the user making a particular type of request related to a particular type of application with which the voice assistant provides assistance. In some embodiments, the expected voice input type may relate to the user answering a question from a set of questions that the voice assistant asks regarding the particular application. In some embodiments, the expected voice input type may relate to the user making a request in response to a general prompt from the voice assistant (e.g., "How may I help you?"). In some embodiments, the transcript features of the first voice input data that may indicate an expected voice input type may include characteristics that an AI model would expect a voice input to have based on the type of voice input that it is. The transcript features may include use of a particular word or phrase, the number of uses of a particular word or phrase, the duration for which the user spoke, the number of words spoken, the type of words spoken, any combination of the aforementioned, etc.

For example, a response to the question "what is your user ID" may be expected to have the transcript features of: nine numbers, spoken consecutively, without any other words spoken in between the numbers. A response provided by the user having only five numbers spoken consecutively may be identified by the AI model as not indicative of an expected voice input type. As another example, a response to the prompt "state your question" may be expected to have transcript features indicative of a question. These transcript features may include the length of the response, the use of interrogatory words (e.g., who, what, where, when, why), use of words indicating requests (e.g., help, need, would like), use of particular words that describe aspects of the particular function the application with which the voice assistant is working provides (e.g., a Human Resources application regarding employee benefits selection may have transcript features related to the particular medical, dental, or insurance benefits provided by the Human Resources group), etc.

In some embodiments, the expected voice input type may be learned by the AI model analyzing features of responses or voice inputs provided by other users (e.g., historical users) to the particular dialog turn. For example, in response to a question by the conversational assistant asking for a phone number, users located in a particular city where there is only one area code may typically respond by only providing a seven digit phone number, rather than a 10 digit phone number that includes an area code. Users who are employees of a US company that are located outside the US may respond with phone numbers with varying number of digits that are accounted for by different countries' phone systems and country codes associated with the countries.

In some embodiments, analyzing the first voice input data may include determining that transcript features and attributes of the first voice input data are not associated with the user. For example, there may be transcript features or attributes in the user's speech that are typical for the user (e.g., occur frequently in the user's speech or occur as part of speech patterns that do not indicate that the user has completed speaking or that the user had not completed speaking). In some embodiments, these transcript features and attributes associated with the user may occur infrequently in the speech or vocal patterns of other users with which the examination engine was trained. In some embodiments, the transcript features or attributes associated with the user may be used ordinarily (e.g., when they are not typical for the user) by the examination engine to determine that additional time is recommended for the voice input to be provided by the user or that additional time is not recommended for the voice input to be provided by the user. In some embodiments, the examination engine may be trained to filter out the transcript features or attributes of voice inputs that are typical for the user (e.g., associated with the user) when making a determination about whether additional time is recommended.

The transcript features or attributes of the first voice input that are associated with the user may relate to vocal characteristics of the user or word usage of the user. In some embodiments, these features or attributes may be observed/detected by the examination engine during dialog turns that the user previously made (e.g., inputs during a single conversation with the voice assistant having multiple dialog turns), when the user previously used the voice assistant on other occasions, when the user previously used another voice assistant program, or when the user previously provided voice input to another type of application that receives voice data.

As an example, a user may speak very fast, and on average, his voice inputs may be fifty percent shorter (in time) than typical responses with which the examination engine was trained. Another user may have a monotone voice and not have fluctuations in pitch indicative of hesitation or completion of a question. As another example, a user may frequently use filler words (e.g., um, like) and may also frequently use filler words at end of a sentence or question. These transcript features or attributes may deviate from the data used to train the AI model of the examination engine sufficiently to cause erroneous determinations that additional time is or is not needed for the voice input to be provided by the user.

In some embodiments, the processor may identify transcript features or vocal characteristics of voice input data based on which the examination engine has been trained to determine whether additional time is needed for a voice input. In some embodiments, the processor may identify which of those features are present in the first voice input data. In some embodiments, the processor may identify whether the processor determined that additional time is needed for the voice input in order to receive/capture the voice input data that made up that response/voice input or whether the processor determined that additional time is not needed. The processor may identify the transcript features or vocal characteristics of the first voice input data that indicate the opposite of the determination by the examination engine regarding additional time (e.g., that indicate that additional time is not needed when the examination engine ultimately determined that additional time is needed for the user to provide the voice input or that indicate that additional time is needed when the examination engine ultimately determined that additional time is not needed for the user to provide the voice input). If the transcript features or vocal characteristics that indicate the opposite of the determination occur more than a threshold number of times during the speech of the user (e.g., during the first voice input data being analyzed or other data regarding voice inputs available to the processor from other dialog turns or other voice assistant), the processor may tag these transcript features or vocal characteristics as typical for the user and not use them when making a determination about whether additional time is needed/recommended for the voice input to be provided by the user.

In some embodiments, the processor may revise the time threshold to increase the duration based on which voice input data is received. In some embodiments, in response to determining that additional time is needed for a complete voice input to be provided by the user, the processor may increase the duration of the pause that must be detected before triggering the capture and analysis of the voice input data of (e.g., analysis by the examination engine regarding whether the voice input data captured include a complete or incomplete dialog turn). For example, the revised time threshold may be met by a pause that is equal to or greater than three seconds in duration.

In some embodiments, the processor may continue to monitor the voice input provided by the user for the dialog turn (e.g., the same dialog turn of the user during which it was determined that additional time is need for the voice input of the user) in response to determining that the time threshold for the duration should be increased to the revised time threshold. In some embodiments, the processor may apply the revised time threshold to detection of durations during later dialog turns for the user (e.g., the user previously monitored to determine that time threshold should be increased may continue to have dialog turns with the voice assistant).

In some embodiments, the processor may monitor the voice input to the first dialog turn. In some embodiments, the processor may detect a second pause in the voice input having a duration that satisfies the revised time threshold. For example, the user may be communicating with a voice assistant for an insurance company. After being prompted by the question "Which benefits can I help you with today?", the user may respond "I would like help with medical and (pause 2 seconds) dental (pause 3 seconds)." The time threshold may be set at 1.5 seconds, and the first segment of the voice input (e.g., the segment prior to the pause greater than or equal to 1.5 second) "I would like help with medical and" is received and analyzed by the examination engine. Based on the transcript features of the segment (e.g., ending the segment in a conjunction), the AI model may determine that additional time in needed for the voice input. A revised time threshold of 2.5 seconds may be determined/provided. The processor may detect a pause in the voice input "I would like help with medical and (pause 2 seconds) dental (pause 3 seconds)" that satisfies the revised time threshold.

In some embodiments, the processor may receive, based on the detected second pause, second voice input data. For example, based on the detection of a pause that is 2.5 seconds or longer, the processor may receive the second voice input data regarding the segment of the voice input prior to the detected pause that satisfied the revised time threshold (e.g., "I would like help with medical and dental").

In some embodiments, the processor may analyze the second voice input data. In some embodiments, the processor may determine that additional time is not recommended for the voice input to be provided by the user. In some embodiments, the processor may send the second response data to a dialog engine. For example, the processor may send the second response data "I would like help with medical and dental" to the dialog engine for the voice assistant to further respond to the request made by the user in this dialog turn. In some embodiments, the dialog engine may be the component of the voice assistant that interprets the meaning of the voice input data from the user to provide an appropriate response or further communication.

In some embodiments, the determination that additional time is not recommended for the voice input may be made using a rule-based system that assigns value to and tabulates the values for features of the second voice input data that are analyzed. For example, time may be increased if the transcript of the current segment (e.g., the string of words in the second voice input data) ends with a conjunction or filler word, if the voice inflection trends downward at the end of the segment, if the voice data includes more vocal variation than previous turns, if the transcript of the second voice input data segment does not satisfy a slot response or full intent (e.g., a response of "I need . . . " when asked "How may I help you?"), if the transcript of the segment does not match typical "final" fragments, or if vocal characteristics of the user's voice are not constant (e.g., indicating a hesitant response).

Time may be decreased if the transcript of the current segment does not end with a conjunction or filler word, if the voice inflection does not trend downward at the end of the segment, if the voice data includes less vocal variation than previous turns, if the transcript of the second voice input data segment satisfies a slot response or full intent (e.g., a response of a nine digit number when asked "what is your user 9-digit user ID?"), if the transcript of the segment matches typical "final" fragments, or if vocal characteristics of the user's voice are constant (e.g., indicating a confident response).

In some embodiments, the processor may revise the time threshold to decrease the duration based on which response data is received. In some embodiments, in response to determining that additional time is not needed for a complete voice input to be provided by the user, the processor may decrease the duration of the pause that must be detected before triggering the capture and analysis of the voice input data of (e.g., analysis by the examination engine regarding whether the second voice input data captured included a complete or incomplete dialog turn). For example, the decreased time threshold may be met by a pause that is equal to or greater than 2.5 seconds in duration.

In some embodiments, the processor may apply the decreased time threshold to additional turns in a conversation. For example, during a first turn in the conversation, the conversational assistant may ask the user to provide her user ID (e.g., "what is your user ID?"). During the second turn in the conversation, the user may provide a response (e.g., "my user ID is 123456789). During the third dialog turn in the conversation, the conversational assistant may ask the user another question (e.g., "how may I update your account information?"). During the fourth dialog turn in the conversation, the user may respond (e.g., "I would like to update my address to 1234 Private Drive (2 second delay), Apartment 102 (3 second pause"). The time threshold may have been decreased to 2.5 seconds after the second dialog turn in the conversation. When the user provides voice input giving her updated address, the full address "1234 Private Drive, Apt. 102" is captured because that segment of the voice input was provided prior to a pause that met the decreased time threshold.

In some embodiments, the voice input data from the segment prior to the detected pause (e.g., satisfying the decreased time threshold) may be received by the processor and sent to the dialog engine for the voice assistant to process and complete its task/conversation with the user.

Referring now to FIG. 1, a block diagram of a system 100 for determining when a user is finished providing a voice input is illustrated. System 100 includes a user device 102 having a conversational assistant 104 and a microphone 106. The conversational assistant 104 includes an orchestration layer 110, a speech transcription engine 112, and a dialog engine 114. In some embodiments, the user device 102 may be any device that contains a processor configured to perform one or more of the functions or steps described in this disclosure.

In some embodiments, the orchestration layer 110 receives data regarding a context for a first dialog turn. The conversational assistant 104 monitors a voice input from a user into the microphone 106 of the user device 102 for the first dialog turn. The speech transcription engine 112 feeds continuous or interim transcripts of the voice input to the orchestration layer 110. The speech transcription engine 112 also provides vocal characteristic data regarding vocal characteristics of the user's speech and transcript feature data regarding the language/words used by the user to the orchestration layer 110. The orchestration layer 110 detects a first pause in the voice input that has a duration that satisfies a time threshold. The orchestration layer 110 receives the first voice input data regarding a first segment of the voice input prior to the first pause. The orchestration layer 110 analyzes the first voice input data using an examination engine 108. The orchestration layer 110 determines that additional time is recommended for the voice input to be provided by the user based on the analysis of the examination engine 108.

In some embodiments, the orchestration layer 110 revises the time threshold to increase the duration based on which the length of the voice input segment is determined.

In some embodiments, the conversational assistant 104 continues to monitor the voice input from the user for the first dialog turn. The speech transcription engine 112 feeds transcripts, vocal characteristic data, and transcript feature data to the orchestration layer 110. The orchestration layer 110 detects a second pause in the voice input that has a duration that satisfies the revised time threshold. The orchestration layer 110 receives the second voice input data regarding a second segment of the voice input prior to the second pause. The orchestration layer 110 analyzes the second voice input data using the examination engine 108. The orchestration layer 110 determines that additional time is not recommended for the voice input to be provided by the user based on the analysis of the examination engine 108. The orchestration layer 110 sends the second voice input data to the dialog engine 114 for the conversational assistant 104 to respond to the user's voice input.

In some embodiments, the orchestration layer 110 may revise the revised time threshold to decrease the duration based on which the length of the voice input segment is determined for other dialog turns.

In some embodiments, the examination engine 108 may identify that an attribute of the first voice input data is indicative of an incomplete voice input. In some embodiments the attribute is related to vocal characteristics assessed by the speech transcription engine 112. In some embodiments, the examination engine 108 may identify that transcript features of the first voice input data are indicative of an incomplete voice input. In some embodiments, the examination engine may utilize the dialog engine 114 to determine whether the transcript of the voice input data indicates that a fragment of a sentence was received (e.g., based on a segment ending in a conjunction).

In some embodiments, the examination engine 108 may identify that transcript features of the first voice input data are not indicative of an expected voice input type. In some embodiments, the examination engine may utilize the dialog engine 114 to determine whether the transcript of the voice input segment matches expected voice input types. In some embodiments, the examination engine 108 may determine that transcript features and attributes of the first voice input data are not associated with the user (e.g., typical for the user).

Figure 2:
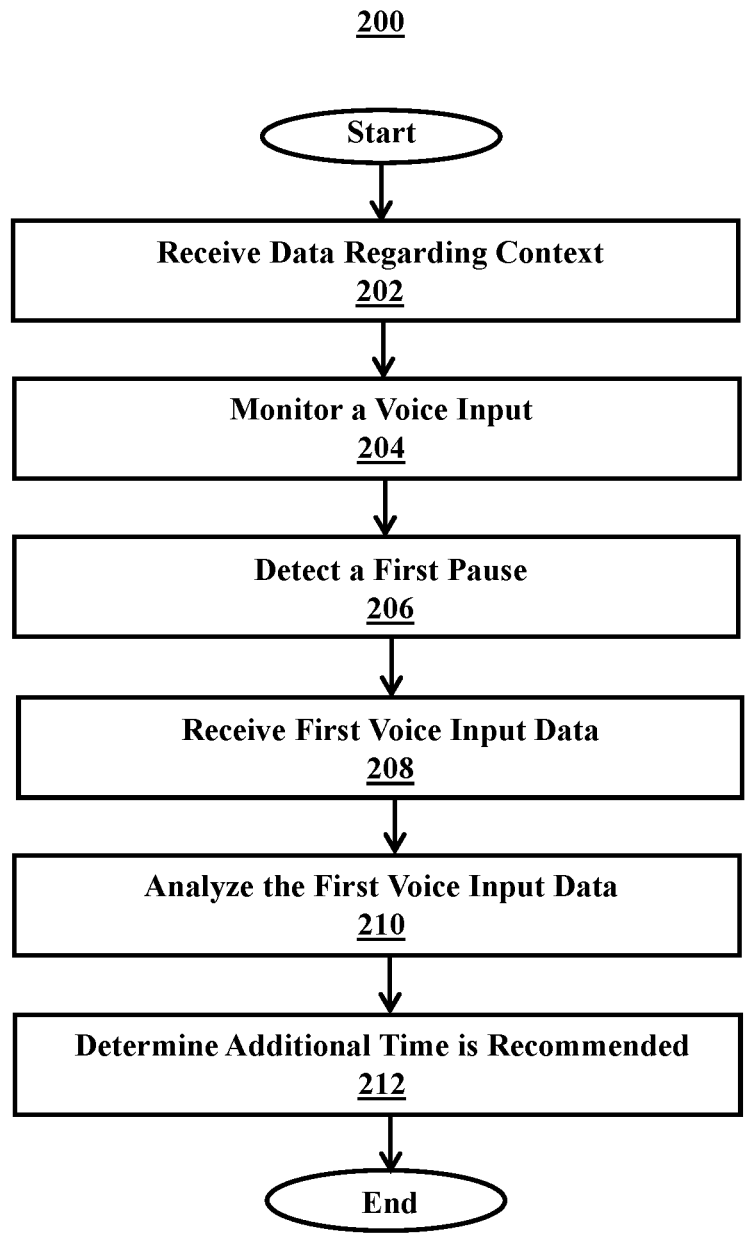
FIG. 2 is a flowchart of an exemplary method system for determining when a user is finished providing a voice input, in accordance with aspects of the present disclosure.

Referring now to FIG. 2, illustrated is a flowchart of an exemplary method 200 for determining when a user is finished providing a voice input, in accordance with embodiments of the present disclosure. In some embodiments, a processor of a system may perform the operations of the method 200. In some embodiments, method 200 begins at operation 202. At operation 202, the processor receives data regarding a context for a first dialog turn. In some embodiments, method 200 proceeds to operation 204, where the processor monitors a voice input from a user for the first dialog turn. In some embodiments, method 200 proceeds to operation 206. At operation 206, the processor detects a first pause in the voice input, the first pause having a duration that satisfies a time threshold. In some embodiments, method 200 proceeds to operation 208. At operation 208, the processor receives, based on the first pause, first voice input data. In some embodiments, method 200 proceeds to operation 210. At operation 210, the processor analyzes the first voice input data. In some embodiments, method 200 proceeds to operation 212. At operation 212, the processor determines that additional time is recommended for the voice input to be provided by the user.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
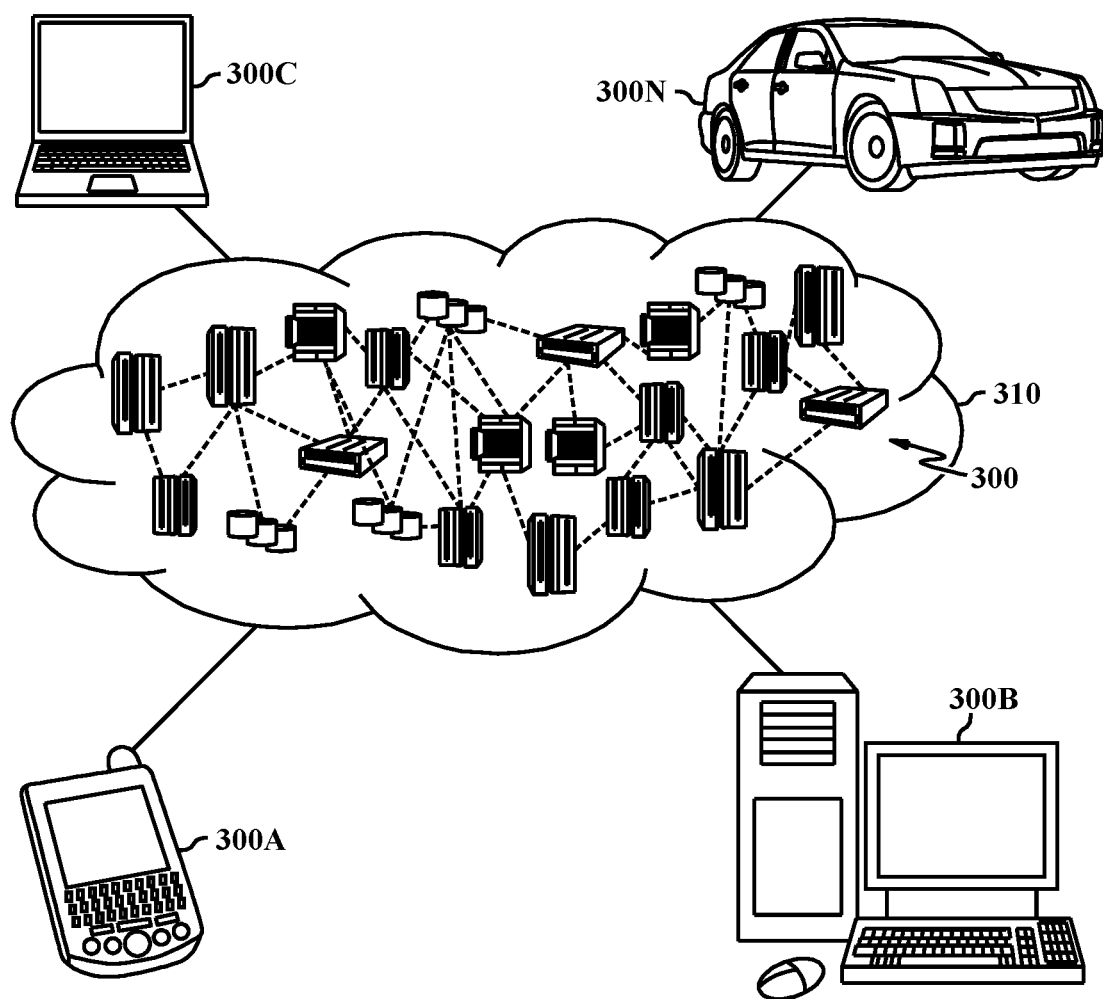
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
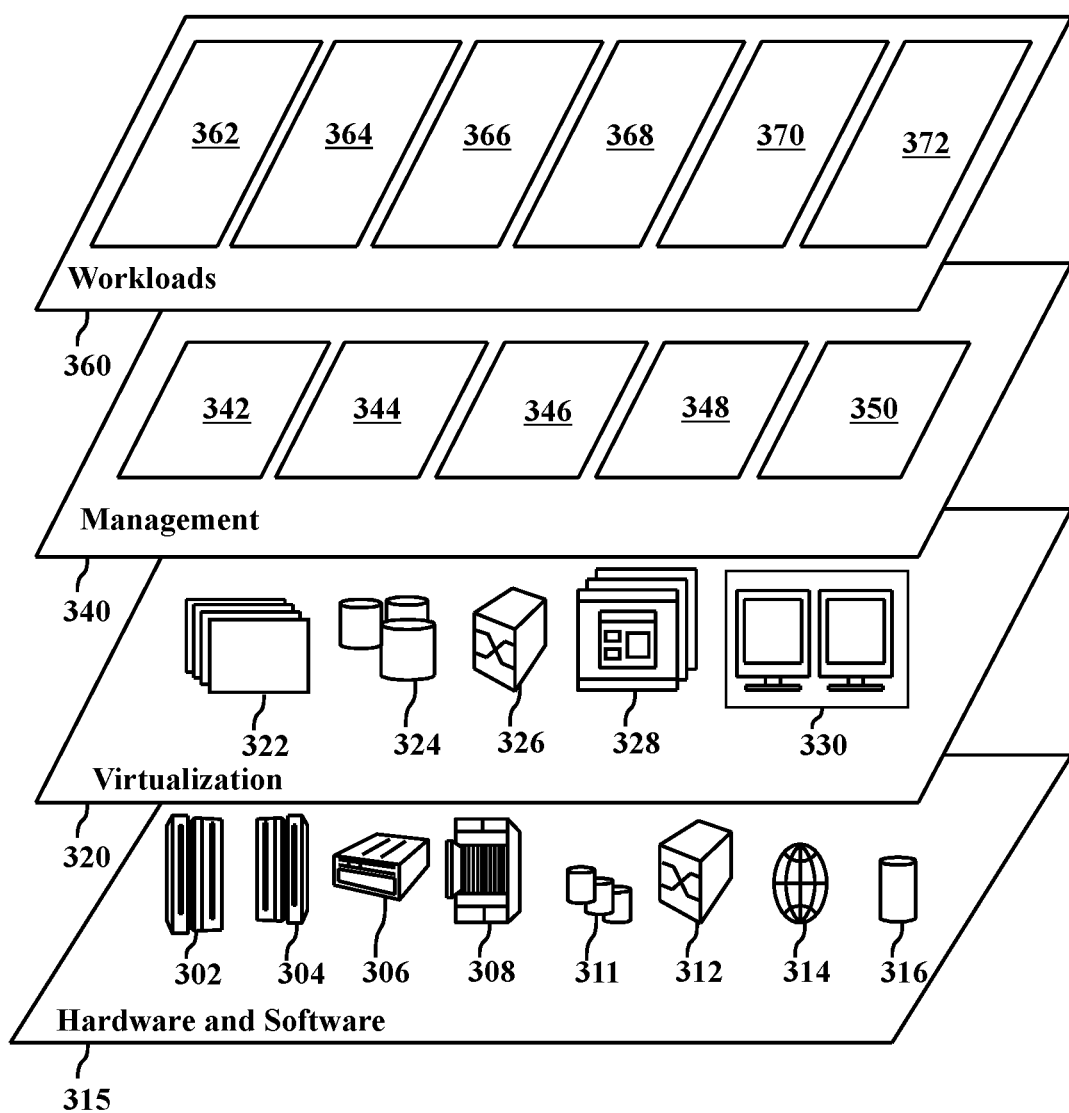
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and determining when a user is finished providing a voice input 372.

Figure 4:
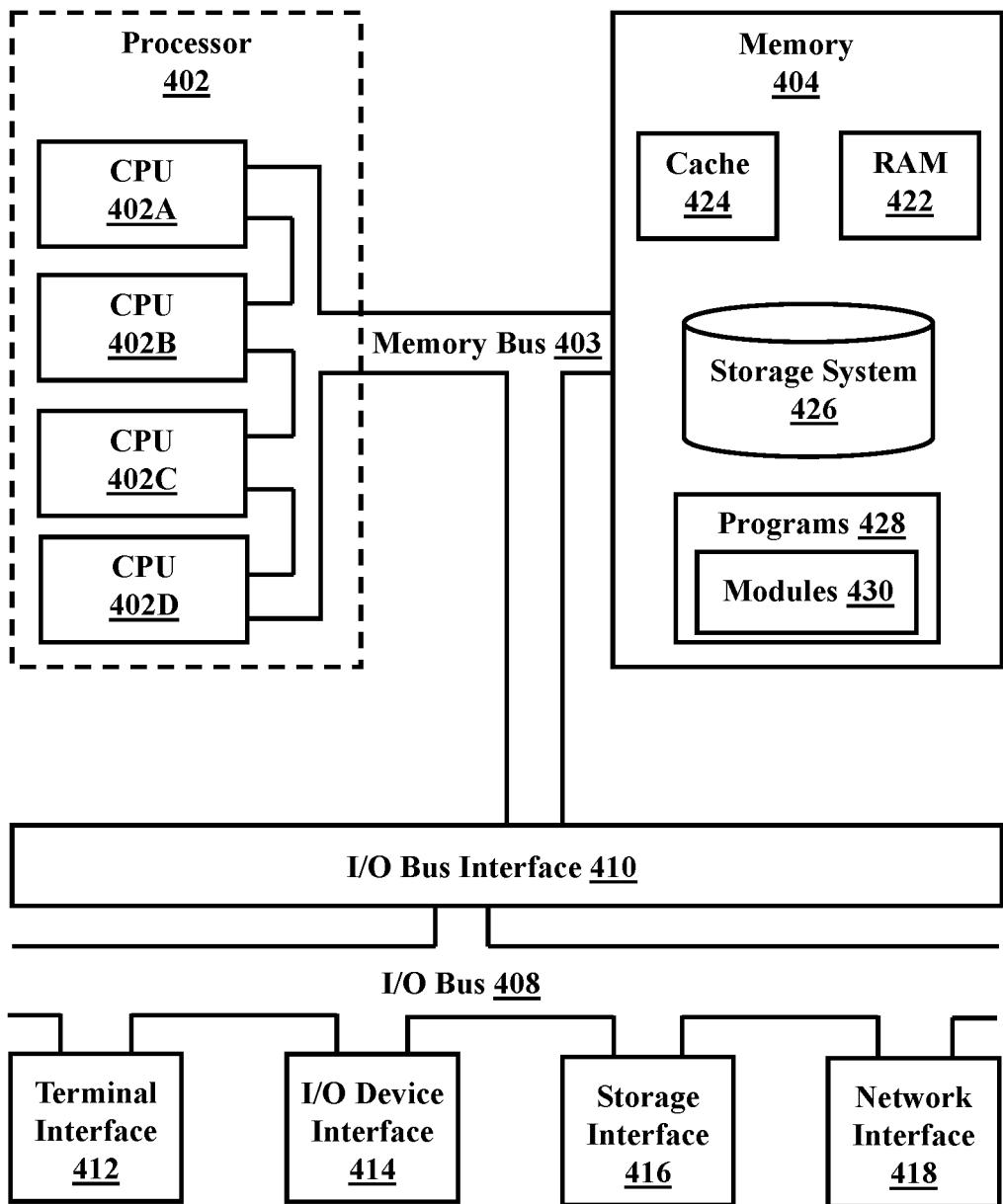
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
   receiving, by a processor, data regarding a context for a first dialog turn;
   monitoring a voice input from a user for the first dialog turn;
   detecting a first pause in the voice input, the first pause having a duration that satisfies a time threshold;
   receiving, based on the first pause, first voice input data;
   analyzing the first voice input data; and
   determining that additional time is recommended for an additional voice input to be provided by the user.

2. The method of claim 1, further comprising:
   revising the time threshold to increase the duration based on which voice input data is received.

3. The method of claim 2, further comprising:
   monitoring the voice input from the user for the first dialog turn;
   detecting a second pause in the voice input, the second pause having a duration that satisfies the revised time threshold;
   receiving, based on the second pause, second voice input data;
   analyzing the second voice input data;
   determining that additional time is not recommended for the additional voice input to be provided by the user; and
   sending the second voice input data to a dialog engine.

4. The method of claim 3, further comprising:
   revising the time threshold to decrease the duration based on which voice input data is received.

5. The method of claim 1, wherein analyzing the first voice input data includes:
   identifying that an attribute of the first voice input data is indicative of an incomplete voice input.

6. The method of claim 1, wherein analyzing the first voice input data using includes:
   identifying that transcript features of the first voice input data are indicative of an incomplete voice input.

7. The method of claim 1, wherein analyzing the first voice input data includes:
   identifying that transcript features of the first voice input data are not indicative of an expected voice input type.

8. The method of claim 1, wherein analyzing the first voice input data includes:
   determining that transcript features and attributes of the first voice input data are not associated with the user.

9. A system comprising:
   a memory; and
   a processor in communication with the memory, the processor being configured to perform operations comprising:
   receiving data regarding a context for a first dialog turn;
   monitoring a voice input from a user for the first dialog turn;
   detecting a first pause in the voice input, the first pause having a duration that satisfies a time threshold;
   receiving, based on the first pause, first voice input data;
   analyzing the first voice input data; and
   determining that additional time is recommended for an additional voice input to be provided by the user.

10. The system of claim 9, the processor being further configured to perform operations comprising:
    revising the time threshold to increase the duration based on which voice input data is received.

11. The system of claim 10, the processor being further configured to perform operations comprising:
    monitoring the voice input from the user for the first dialog turn;
    detecting a second pause in the voice input, the second pause having a duration that satisfies the revised time threshold;
    receiving, based on the second pause, second voice input data;
    analyzing the second voice input data;
    determining that additional time is not recommended for the additional voice input to be provided by the user; and
    sending the second voice input data to a dialog engine.

12. The system of claim 11, the processor being further configured to perform operations comprising:
    revising the time threshold to decrease the duration based on which voice input data is received.

13. The system of claim 9, wherein analyzing the first voice input data includes:
    identifying that an attribute of the first voice input data is indicative of an incomplete voice input.

14. The system of claim 9, wherein analyzing the first voice input data using includes:
    identifying that transcript features of the first voice input data are indicative of an incomplete voice input.

15. The system of claim 9, wherein analyzing the first voice input data includes:
    identifying that transcript features of the first voice input data are not indicative of an expected voice input type.

16. The system of claim 9, wherein analyzing the first voice input data includes:

determining that transcript features and attributes of the first voice input data are not associated with the user.

17. A computer program product comprising a computer readable storage medium having program instructions embodied therewith, the program instructions executable by a processor to cause the processor to perform operations, the operations comprising:
- receiving data regarding a context for a first dialog turn;
- monitoring a voice input from a user for the first dialog turn;
- detecting a first pause in the voice input, the first pause having a duration that satisfies a time threshold;
- receiving, based on the first pause, first voice input data;
- analyzing the first voice input data; and
- determining that additional time is recommended for an additional voice input to be provided by the user.

18. The computer program product of claim 17, the processor being further configured to perform operations comprising:
- revising the time threshold to increase the duration based on which voice input data is received.

19. The computer program product of claim 18, the processor being further configured to perform operations comprising:
- monitoring the voice input from the user for the first dialog turn;
- detecting a second pause in the voice input, the second pause having a duration that satisfies the revised time threshold;
- receiving, based on the second pause, second voice input data;
- analyzing the second voice input data;
- determining that additional time is not recommended for the additional voice input to be provided by the user; and
- sending the second voice input data to a dialog engine.

20. The computer program product of claim 19, the processor being further configured to perform operations comprising:
- revising the time threshold to decrease the duration based on which voice input data is received.

* * * * *